A. Hallam,
Fruit Packer.
Nº 3,270.   Patented Sep. 14, 1843.
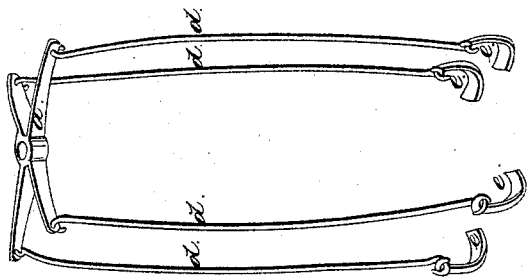
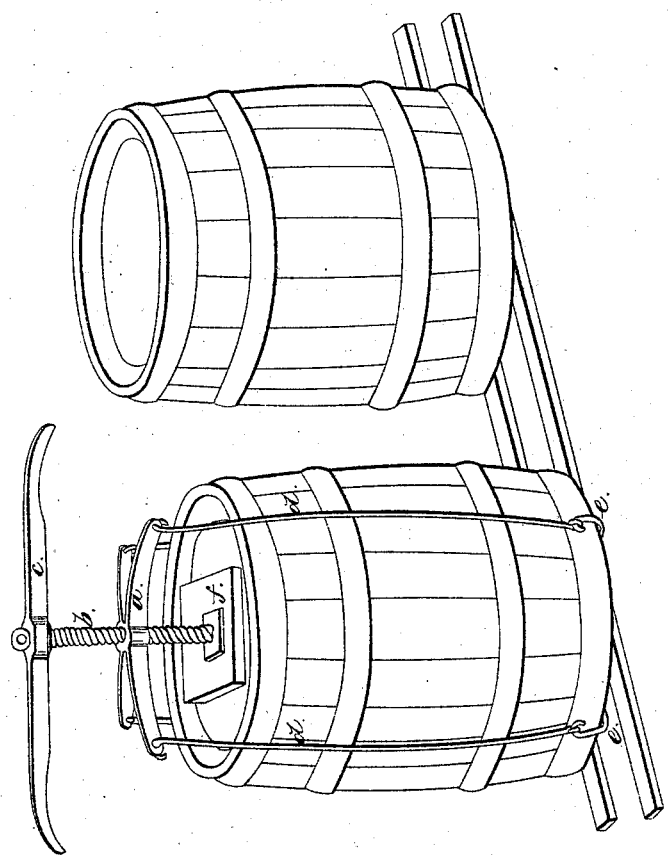

UNITED STATES PATENT OFFICE.

ALEXR. HALLAM, OF NEW ORLEANS, LOUISIANA.

PORTABLE SCREW-PRESS.

Specification of Letters Patent No. 3,270, dated September 14, 1843.

*To all whom it may concern:*

Be it known that I, ALEXANDER HALLAM, of New Orleans, in the parish of Orleans and State of Louisiana, have invented a new and useful portable screw for pressing the heads into tobacco-hogsheads after they have been opened for inspection, thereby preventing the great loss of the article occasioned by inspection; and I do hereby declare that the following is a full, clear, and exact description thereof, reference being had to the accompanying drawing, which forms a part of this specification, in which—

Figure 1, shows the screw applied to the hogshead; Fig. 2, the hooks detached.

The nature of my invention consists in connecting with a screw and cross head four more or less cant-hooks by means of rods or chains so that the screw may be made to act on the upper head of the cask by applying the cant-hooks to the bottom chine, which can be done without moving it from the skids on which it rests in the ware house. Through the center of a cross head (*a*) of four arms more or less, a vertical screw (*b*) is put which can be turned up and down by means of a winch (*c*): the upper end of the screw may have a ring in it by which the apparatus can be lifted.

To the ends of each of the arms a rod or chain (*d*) is attached which reaches down to the bottom of the cask to be operated on and on its end there is a flat hook (*e*) that can be hooked under the end of the chine of the cask and hold down the cross head while the screw acts on the head to press it down, a follower (*f*) being first placed between the screw and the head.

By the present method in inspecting ware houses a considerable amount of tobacco is left out of each hogshead in order to get in the head again after inspection, or the great trouble and expense of moving the hogshead must be resorted to, to place it under a screw which is in a press frame or box this in many cases is impracticable; but by my method any hogshead in the warehouse can be brought under the action of my portable screw, without moving it from its place.

What I claim as my invention and desire to secure by Letters Patent is—

The combination of cant hooks (*e*) with a screw and cross head constructed and arranged substantially in the manner and for the purpose herein specified.

ALEXR. HALLAM.

Witnesses:
CHARLES B. AVIS,
GEORGE A. UNDERHILL.